United States Patent [19]

Priddle et al.

[11] 3,952,135

[45] Apr. 20, 1976

[54] LAMINATED GLASS WINDOWS FOR VEHICLES

[75] Inventors: John Edward Priddle, Welwyn; Andrzej Pajaczkowski, Harpenden; Peter Incledon Vincent, Welwyn Garden City, all of England

[73] Assignee: Imperial Chemical Industries Limited, London, England

[22] Filed: Mar. 5, 1973

[21] Appl. No.: 337,846

Related U.S. Application Data

[63] Continuation-in-part of Ser. No. 323,397, Jan. 15, 1973, abandoned.

[30] Foreign Application Priority Data

Jan. 18, 1972 United Kingdom.................. 2349/72

[52] U.S. Cl................................. 428/442; 526/317; 428/441
[51] Int. Cl.² .......................................... B32B 17/10
[58] Field of Search............................ 161/203, 204; 260/80.81, 80.8; 428/441, 442

[56] References Cited
UNITED STATES PATENTS

| | | | |
|---|---|---|---|
| 2,231,471 | 2/1941 | Hill | 161/204 |
| 2,400,139 | 5/1946 | Roland | 161/204 X |
| 3,201,374 | 8/1965 | Simms | 260/80.8 |
| 3,344,014 | 9/1967 | Rees | 161/203 |
| 3,488,715 | 1/1970 | Atkins | 161/203 |
| 3,532,590 | 10/1970 | Priddle | 161/204 |
| 3,711,456 | 1/1973 | Gilbert | 161/203 |
| 3,762,988 | 10/1973 | Clock et al. | 161/204 X |

FOREIGN PATENTS OR APPLICATIONS 991,568   5/1965   United Kingdom

*Primary Examiner*—George F. Lesmes
*Assistant Examiner*—Alan T. McDonald
*Attorney, Agent, or Firm*—Cushman, Darby & Cushman

[57] ABSTRACT

Windows for vehicles particularly windscreens comprise sheets of glass adhesively bonded together by means of a hot melt adhesive which is an ethylene copolymer containing from 7 to 18% by weight of methacrylic acid and sufficient methyl methacrylate such that together the methyl methacrylate and methacrylic acid constitute from 20 to 35% by weight of the copolymer and the copolymer has a melt flow index of at least 0.1 and not more than 2. Also disclosed are ethylene copolymers as defined above.

6 Claims, No Drawings

LAMINATED GLASS WINDOWS FOR VEHICLES

This application is a continuation-in-part of our U.S. application Ser. No. 323,397 filed Jan. 15, 1973, now abandoned.

This invention relates to laminated glass windows for vehicles particularly windscreens and to ethylene copolymers for use in their manufacture.

Laminated glass windscreens for vehicles conventionally comprise a plurality of either flat or curved sheets of glass adhesively bonded together by means of hot melt adhesive material. Usually windscreens are made by first converting the hot melt adhesive material into a foil which is subsequently sandwiched between opposed surfaces of two sheets of glass. The sandwich is heated to melt the adhesive and then cooled to cause the adhesive to re-solidify whereupon it makes an adhesive bond between the opposed surfaces of the glass.

Obviously windscreens should be highly transparent and have a good impact resistance over a wide range of temperatures. However, the good impact resistance of the windscreen should be combined with an ability to yield during impact so that, in the event of the vehicle becoming involved in an accident, a person behind the windscreen may be cushioned against the full force of an impact of his head against the windscreen by the ability of the windscreen to yield. Also the bond between the foil of hot melt adhesive material and the glass should be sufficiently strong to ensure that, despite an impact, the glass tends to remain bonded to the hot melt adhesive material thereby minimising the risk of injury from flying glass. Foils made from the hot melt adhesive should be flexible so that the foil can follow the curve of any curved sheets of glass between which it may be sandwiched without sustaining cracks or stresses which would impair the optical properties of the windscreen.

For many years plasticised polyvinyl butyral has been the hot melt adhesive material used in making laminated windscreens for motor vehicles. However, foils made from such plasticised polyvinyl butyral have the disadvantage of being tacky not only in the molten state but also at ambient temperatures so that the foils of polyvinyl butyral used in making windscreens are difficult to handle, often requiring storage and transport at low temperatures. These difficulties arise primarily from the presence of plasticiser which is necessary to ensure that foils made from polyvinyl butyral are adequately flexible. In practice the degree and type of plasticisation has to be carefully chosen so as to give the best compromise between ease of manufacture of the windscreen and the properties of the windscreen when manufactured. Further, the moisture content of the plasticised polyvinyl butyral foils must be carefully controlled if satisfactory windscreens are to be made and proper control of the moisture content necessitates hanging the foils in an environment of a constant humidity for a lengthy period of time prior to their use in the manufacture of windscreens.

The difficulties associated with plasticised polyvinyl butyral have led to many attempts over a long period of time to provide a more convenient adhesive for use in making laminated glass. For example, British patent specification No. 582,087 (published in 1946) describes the use of copolymers of ethylene with vinyl acetate and/or methyl methacrylate as an adhesive for laminated glass stated to be valuable as safety glass in motor vehicles. However simple copolymers of ethylene with vinyl acetate and/or methyl methacrylate suffer a loss of adhesiveness as a result of being subjected to humid conditions and therefore they do not possess sufficient retention of adhesiveness to enable the windscreens to meet modern requirements for fragment retention (i.e. risk of injury from flying glass is unacceptable by present day standards).

British patent specification No. 796,899 (published in 1958) refers to the desirability of using hydrolysed copolymers of ethylene and vinyl acetate instead of polyvinyl butyral as interlayer for safety glass, but points out that they had not found wide use because of their lower toughness particularly at lower temperatures, their embrittlement on long-term exposure, and their lower adhesiveness at moderate and low temperatures as compared to the polyvinyl acetal resins. In order to overcome these deficiences British patent specification No. 796,899 proposes admixing certain organic phosphorus compounds with the hydrolysed copolymers of ethylene and vinyl acetate as plasticising agents. Similarly, British patent specification, Nos. 1,154,338, 1,156,019 and 1,156,020 (all published in 1969) relate to blending copolymers of ethylene and unsaturated carboxylic acids or their salts with plasticisers in order to make the copolymers more suitable for use as interlayers in the manufacture of safety glass.

Canadian Pat. Spec. No. 768,124 (published in 1967) relates to laminates comprising an adherand and bonded thereto at least one layer of a copolymer of ethylene and acrylic acid.

The copolymer contains at least 45 weight % of ethylene, from 2 to 50 weight % of acrylic acid and preferably also up to 45 weight % of a co-monomer such as vinyl acetate or ethyl acrylate, and may be used in safety glass laminates. Terpolymers containing as the adhesive interlayer vinyl acetate are said to be preferred, particularly those having 3.5 – 12 weight % of polymerised acrylic acid and 13 – 20 weight % of polymerised vinyl acetate, together with 1 – 5 weight % of polyisocyanate to effect cross-linking of the resin. However, ethylene copolymers containing copolymerised units of vinly acetate and acids such as acrylic acid are unsuitable for use in the manufacture of windscreens on a commerical scale because their properties are apt to vary in an unpredictable fashion, possibly owing to interaction between the acidic groups and the esterifying vinyl groups. Moreover, none of the terpolymers of ethylene, acrylic acid and ethyl acrylate exemplified in the Canadian specification has adequate adhesiveness and transparency to enable it to be used for making windscreens in competition with plasticised polyvinylbutyral.

French Pat. spec. No. 1,391,208 (published in 1965) relates to laminated safety glass made using as the laminating adhesive a copolymer of ethylene with an acid such as acrylic or methacrylic acid, and states that it is not absolutely necessary for the copolymer to be one with just two components because one could mix ethylene with other olefines or add other comonomers containing polar groups at the same time as the acid comonomer. However, the French specification states that to obtain the properties required of a safety glass interlayer it is necessary to neutralise at least 10% of the acid groups of the copolymer, and a copolymer of ethylene containing 10% by weight of methacrylic acid without neutralisation is described in the Examples as "opaque" (hence lacking the necessary transparency). Similarly British patent specification No. 1,154,620

(published in 1969) relates to laminated safety glass such as windscreens in which the binding layer of the laminated structure consists of ethylene polymers containing therein carboxylate groups and if desired amide and/or ester groups. The preferred ethylene polymer is said to contain both carboxylate groups (preferably in sodium or potassium salt form) and amide groups, and the method of preparing it involves hydrolysing a copolymer of ethylene with an ester of acrylic or methacrylic acid in the presence of an alkali metal hydroxide and ammonia.

U.S. Pat. spec. No. 3,488,715 published in 1970 relates to the irradiation of copolymers of ethylene in order to make them more suitable for use as interlayers in the manufacture of laminated glass.

The use of 2-hydroxyethyl methacrylate and similar compounds as comonomers in ethylene copolymers for use as interlayers in safety glass is described in British patent specifications Nos. 1,166,443 and 1,256,872 (published in 1969 and 1971 respectively), but such a comonomer is relatively inaccessible as an article of commerce and no compensating technical superiority of the interlayers thus produced was demonstrated.

It is an object of this invention to provide windscreens of laminated glass which comprise a copolymer of ethylene as a hot melt adhesive material and which possess good transparency and good impact resistance over the normal range of temperatures at which the windscreen is likely to be used.

Accordingly by this invention we provide a laminated glass window, particularly a vehicle windscreen, comprising opposed sheets of glass whose opposed surfaces are adhesively bonded together by means of a novel copolymer of ethylene which has a melt flow index in grams per 10 minutes as determined according to British Standard 2782: Part 1 1956 (Method 105C: Procedure A) of at least 0.1 and not more than 2 and which comprises from 2.65 to 7.75 mole % of copolymerised acrylic and/or methacrylic acid and in addition sufficient copolymerised acrylic and/or methacrylic ester (the esterifying group being alkyl containing from 1 to 4 carbon atoms) such that the ester and the acid together constitute at least 6.9 mole % and not more than 14 mole % of the copolymer. Further, according to the invention in another aspect there is provided the aforesaid novel copolymer of ethylene, ester and acid as defined above. It is preferred that the esterifying group be a methyl or a butyl group and the preferred ester is methyl methacrylate. The preferred acid is methacrylic acid. When the copolymer is a copolymer of ethylene, methyl methacrylate and methacrylic acid, the above mole percentages correspond to about 7 to 18% by weight of methacrylic acid and 20 to 35% by weight of methyl methacrylate and methacrylic acid together.

Increasing the acid content of the copolymer beyond 7.75 mole % leads to a decrease in the flexibility of foils made from the copolymer. Lack of adequate flexibility prevents the foils from following the curve of curved sheets of glass during manufacture of a curved windscreen and results in cracks and/or stresses occurring which impair the optical properties of the windscreen. Moreover lack of adequate flexibility also results in a puckering of the foil around the edges of the curved sheets of glass which in turn may result in defects in the windscreen such as a poorer adhesive bond between opposed surfaces of glass.

Decreasing the acid content of the copolymer below 2.65 mole % leads to an unacceptable lack of adhesiveness of the copolymer resulting in windscreens which easily de-laminate so that the risk of injury by flying glass during an impact it too great. It is preferred that the copolymer should comprise at least 3.85 mole % and not more than 6.10 mole % of acid.

To obtain windscreens having adequate compact resistance over the normal range of temperatures at which the windscreens are likely to be used, it is necessary that the ester and acid contents of the copolymer should together constitute not more than 14 mole % of the copolymer. On the other hand, to obtain windscreens having adequate transparency it is necessary that the copolymer should contain sufficient ester such that the ester and acid content of the copolymer together constitute at least 6.90 mole % weight of the copolymer. In the case of methacrylic acid, it appears that the presence of the copolymerised acid units in the copolymer has a peculiarly beneficial effect on the transparency of the windscreens. For example windscreens made using an ethylene copolymer which comprises at least 6.90 mole % and not more than 14 mole % of co-monomer are more transparent if the comonomer consists of both methyl methacrylate and methacrylic acid than if the comonomer consists entirely of methyl methacrylate. It is preferred that the ester and acid should together constitute at least 7.80 mole % and not more than 14 mole % of the copolymer.

The melt flow index (as hereinbefore defined) of the copolymer should be at least 0.1. Too low a melt flow index leads to difficulties in the manufacture of the copolymer arising from the fact that the copolymer is too viscous to flow properly at the temperatures at which it leaves the polymerisation reactor. If the melt flow index of the copolymer exceeds 2, windscreens made using such copolymers have inadequate impact resistance over the full range of temperatures at which they are likely to be used. Melt flow indices of 0.2 to 1.4 are preferred.

The impact resistance of the windscreens at room temperatures may be improved by increasing the thickness of the foil of copolymer used in making the windscreens. However, this improvement is only achieved at the cost of reducing the ability of the windscreens to yield during impact so that a person behind the windscreen would be less cushioned against the full force of the impact of his head against the windscreen in the event of an accident. Accordingly, it is preferred to use foils of copolymer of a thickness such that the layer of copolymer sandwiched between opposed glass surfaces in the finished windscreen has a thickness of from 0.35 mm to 1.15 mm.

Preferably the foil used in making windscreens according to this invention should itself have a mean thickness of from 0.35 mm to 1.15 mm. In order to assist in obtaining a windscreen having optimum transparency, it is preferred that the foil be shaped so as to have indentations formed on at least one of its surfaces. The indentations may be parallel grooves in which case the grooves are preferably from 0.025 mm to 0.10 mm deep and spaced at about from 1.5 to 5 per mm. Alternatively the indentations may be obtained by shot blasting the foil. The indentations disappear when the foil of copolymer is melted during manufacture of the windscreens.

The copolymers may be prepared by the known process of ethylene polymerisation at high pressure, the mixture of comonomers being polymerised at a pressure above 100 MN/m² (1000 atmospheres), in the presence of a free radical polymerisation initiator, and at elevated temperature, suitably 120° to 250°C. The monomers are introduced in the proportions found to give the desired proportions in the copolymer under the conditions of reaction. To make copolymers of the highest transparency it is preferred that a well-stirred continuous autoclave reactor be used.

In a widely used process for the production of windscreens, the sheets of glass with the foil of hot melt adhesive material sandwiched between them are assembled in a suitable jig, and the assembly is placed in a flexible bag of plastics or rubber. The bag is then thoroughly evacuated, and the sandwich is placed in an oven, or in an air- or oil-heated autoclave, and heated to a temperature above the softening point of the adhesive. For the copolymers employed in making windscreens according to the present invention this temperature is generally about 110°C (for example between 110° and 160°C) and heating is carried out for a period of about 15 to 30 minutes. However, different temperatures and different time cycles may be used. The pressure of the atmosphere (when an oven is used) or the pressure applied in an autoclave, provides for uniform contact and bonding between the curved sheets of glass and the copolymer. Often the sandwich is removed from the bag and subjected to further heating at temperatures of from 110° to 160°C). The assembly is then cooled or allowed to cool.

To obtain maximum transparency of the copolymers, the sandwich is preferably cooled as rapidly as is possible without risk of causing breakage of the glass. Alternatively, if it is more convenient to allow the sandwich to cool slowly, full transparency may be restored by reheating the sandwich to a temperature of about 100°C and then rapidly cooling it. In either case, the sandwiches may be cooled by plunging them into liquid cooling medium, usually water, suitably at about 40° to 65°C. Cooling may alternatively be accomplished by means of blasts of cold air or water.

The glass surfaces to be bonded may if desired be treated with an adhesion promoter before the sandwich is assembled. For example, silanes of the type described in British patent specification No. 1,095,700 may be used for this purpose.

The invention is illustrated by the following examples.

EXAMPLES 1 to 12 and A to H

Various ethylene copolymers whose compositions and melt flow indices are specified in Table I were made by feeding ethylene, methacrylic acid and methyl methacrylate into a conventional continuous stirred-autoclave high-pressure ethylene reactor. The reactor was maintained at pressures of the order of 186 MN/m$^2$ and temperatures of the order of 190°C. The copolymerisation was promoted by the injection into the reactor of a peroxide initiator having a half-life at 190°C of less than one second.

The ethylene copolymers obtained were converted into foil by milling each copolymer for 10 minutes at 130°C and then pressing the resultant crepe at 130°C between ridged plates so as to obtain a foil having a mean thickness of 0.76 mm and provided with parallel grooves 0.076 mm high and at a spacing of 3.8 per mm. In order to assist in parting the plates from the hot foil, a biaxially oriented film of poly(ethylene terephthalate) was interposed between the surfaces of the plates and the hot ethylene copolymer prior to carrying out the pressing. After pressing, the foil was allowed to cool to room temperature.

Samples from each foil were each sandwiched between sheets of glass and each sandwich was inserted into a plastic bag. The bag was evacuated and then the bag and sandwich were heated for 20 minutes at 160°C. The sandwich was then removed from the bag and the sandwich alone was heated for a further 20 minutes at 160°C. The sandwich was next allowed to cool to 100°C and then quench-cooled by immersion in water maintained at a temperature of 50°C so as to produce a transparent glass laminate.

Representative samples of the laminates obtained in this way were each placed in a wooden frame and tested at either −20°C or +25°C by dropping a steel ball weighing 2.268 kg onto the laminate. The height (called the mean penetration height) from which the ball had to be dropped to penetrate 50% of the samples of the particular laminates being tested is also shown in Table I. The steel ball and the wooden frame used are described in British Standard 857:1967.

Table I also contains comparative examples A to H and also results obtained on carrying out the same test on commercially available windscreens made using plasticised polyvinyl butyral as the hot melt adhesive. Comparative Examples A to C illustrate the consequences of using copolymers having too high a melt flow index. Comparative Examples D and E illustrate the consequences of having either too little or too much acid in the copolymer and Examples F to H illustrate the consequences of using copolymers which contain total amounts of comonomer which lie outside the range of 20 to 35% by weight. Although Example F gave good mean penetration heights, the laminate was very hazy in comparison with the laminates made using plasticised polyvinyl butyral.

EXAMPLES 13, 14, I AND J

The procedures of Examples 1 to 12 and A to H were repeated except that copolymers comprising acrylic acid and/or esters other than methyl methacrylate were made. The compositions and melt flow indices of these copolymers are set out in Table II together with the mean penetration heights recorded when laminates using these copolymers were tested by dropping a steel ball onto them according to the test procedure hereinbefore described.

British Standard 2782: Part 1 1956 (Method 105C: Procedure A) employs a load of 2.16 kg.

TABLE I

| Example | Melt Flow Index in g per 10 mins | *% Weight of methacrylic acid in copolymer | *% Weight of methyl methacrylate in copolymer | Total % weight of methacrylic acid and methyl methacrylate in copolymer | Mean Penetration Height (m) | |
|---|---|---|---|---|---|---|
| | | | | | at −20°C | At +25°C |
| 1 | 0.2 | 17.9 | 16.5 | 34.4 | 2.7 | 6.4 |
| 2 | 0.5 | 13.0 | 13.2 | 26.2 | 3.6 | 5.7 |
| 3 | 0.8 | 11.5 | 13.3 | 24.8 | 2.2 | 5.4 |
| 4 | 0.8 | 11.8 | 12.3 | 24.1 | 3.0 | 4.9 |

TABLE I-continued

| Example | Melt Flow Index in g per 10 mins | *% Weight of methacrylic acid in copolymer | *% Weight of methyl methacrylate in copolymer | Total % weight of methacrylic acid and methyl methacrylate in copolymer | Mean Penetration Height (m) | |
|---|---|---|---|---|---|---|
| | | | | | at −20°C | At +25°C |
| 5 | 1.1 | 14.1 | 14.0 | 28.1 | 2.1 | 5.5 |
| 6 | 1.1 | 12.5 | 12.5 | 25.0 | 2.0 | 5.7 |
| 7 | 1.2 | 11.9 | 11.3 | 23.2 | 3.5 | 6.3 |
| 8 | 1.3 | 16.6 | 10.5 | 27.1 | 2.9 | 6.0 |
| 9 | 1.4 | 8.5 | 13.2 | 21.7 | 2.7 | 5.5 |
| 10 | 1.0 | 10.1 | 14.1 | 24.2 | 3.1 | 6.7 |
| 11 | 1.4 | 17.1 | 6.3 | 23.4 | 2.0 | >7.0 |
| 12 | 1.3 | 16.6 | 17.2 | 33.8 | 3.1 | 6.3 |
| A | 2.4 | 12.8 | 12.6 | 25.4 | 1.1 | 3.8 |
| B | 4.5 | 13.9 | 12.7 | 26.6 | 0.6 | 4.8 |
| C | 5.2 | 15.0 | 14.0 | 29.0 | <0.6 | 6.4 |
| D | 1.1 | 6.5 | 21.5 | 28.0 | >7.6 | 3.5 |
| E | 1.8 | 20.6 | 6.0 | 26.6 | 1.4 | 8.2 |
| **F | 1.2 | 9.3 | 8.0 | 17.3 | 2.3 | 6.8 |
| G | | | | | | |
| H | 5.7 | 5.1 | 31.5 | 36.6 | 2.1 | 4.6 |
| PVB | | Plasticised Polyvinyl Butyral | | | 2.1 | 5.4 to 6.6 |

*As determined by infra-red analysis.
**Hazy

TABLE II

| Example | Melt Flow Index in g per 10 mins | *% by Weight of ester in the copolymer | | *% by Weight of acid in the copolymer | | Total % by weight of ester and acid in copolymer | Mean Penetration Height (m) | |
|---|---|---|---|---|---|---|---|---|
| | | | | | | | At −20°C | At +25°C |
| 13 | 0.2 | 12.2 | Methyl Acrylate | 12.0 | Acrylic Acid | 24.2 | 2.0 | 7.2 |
| 14 | 0.82 | 8.2 / 5 | Butyl Acrylate and Ethyl Acrylate | 12.4 | Methacrylic Acid | 25.6 | 4.0 | 6.0 |
| I | 2.4 | 26 | Methyl Acrylate | 14 | Methacrylic Acid | 40 | — | 3.2 |
| J | 4.1 | 19 | Methyl Acrylate | 12 | Methacrylic Acid | 31 | 1.7 | 3.5 |
| PVB | | Plasticised Polyvinyl Butyral | | | | | 2.1 | 5.4 to 6.6 |

*As determined by infra-red analysis

We claim:

1. A laminated glass window comprising opposed sheets of glass whose opposed surfaces are adhesively bonded together by means of a copolymer of ethylene which has a melt flow index in grams per 10 minutes of at least 0.1 and not more than 2 and which consists essentially of from 2.65 to 7.75 mole % of copolymerised acrylic or methacrylic acid and in addition sufficient copolymerised methyl methaceylate such that the ester and the acid together constitute at least 6.9 mole % and not more than 14 mole % of the copolymer.

2. A laminated glass window according to claim 1 wherein the window is a windscreen.

3. A window according to claim 1 wherein the sheets of glass are bonded together by means of a copolymer comprising at least 3.85 mole % to 6.10 mole % of copolymerised acrylic or methacrylic acid.

4. A window according to claim 1 wherein the sheets of glass are bonded together by means of a copolymer in which the ester and the acid together constitute at least 7.80 mole % and not more than 14 mole % of the copolymer.

5. A window according to claim 1 wherein the sheets of glass are bonded together by means of a copolymer having a melt flow index of at least 0.8 and not more than 1.4.

6. A window according to claim 1 wherein the sheets of glass are bonded together by means of a copolymer in which the copolymerised acid is methacrylic acid.

* * * * *